April 4, 1944.  E. E. BROSIUS  2,345,572
MANIPULATOR
Filed Sept. 23, 1940  2 Sheets-Sheet 2

INVENTOR
Edgar E. Brosius

Patented Apr. 4, 1944

2,345,572

UNITED STATES PATENT OFFICE 2,345,572

MANIPULATOR

Edgar E. Brosius, Pittsburgh, Pa.

Application September 23, 1940, Serial No. 357,852

6 Claims. (Cl. 78—96)

This invention relates to manipulators and particularly to manipulators employed in handling and manipulating bars, billets, ingots and the like during the performance of forging operations thereon.

Manipulators of the type above mentioned generally have a projecting peel for gripping and holding the work over an anvil while a hammer descends upon the work to forge it. Since the forging operation reduces the vertical dimension of the work it results in a sharp downward thrust or shock on the end of the peel. The manipulator has mechanism for raising, lowering and turning the peel to enable the work to be positioned as desired, as well as means for opening and closing the peel jaws between which the work is gripped. The shock imparted through the peel to the manipulator in each forging operation in substantial and imposes a strain upon the manipulator. It has heretofore been proposed to relieve to some extent the strain thus imposed on the manipulator by making the peel articulated with springs holding it normally rigid but yieldable upon the downward movement of the end of the peel due to a forging blow. While the articulated peel has been used and has proved satisfactory in a measure this arrangement did not relieve the manipulator as a whole of shock to the desired extent and the springs were found to lose their hardness due to their proximity to the relatively great heat to which the work holding end of the peel is subjected in use.

I have devised a manipulator obviating the disadvantages of the prior manipulators and which compensates for the shocks imparted to the peel in forging in such a way as to relieve the manipulator as a whole of severe stresses. I preferably employ a non-resilient peel carried by a peel carrier or frame. I preferably mount the peel carrier on a main support or chassis and employ a lost motion connection between the peel carrier and the support permitting movement of the peel carrier relatively to the support when the peel is subjected to shock as in a forging operation. The lost motion connection is preferably in the form of a resilient connection and I find it satisfactory to employ a member pivotally connected to one of the peel carriers and the support and slidably connected with the other thereof to permit movement of the peel carrier relatively to the support when the peel is subjected to shock. I prefer to pivot the peel carrier to the support intermediate its ends and to provide the lost motion connection between the peel carrier and the support adjacent the rearward end of the peel carrier, that is to say, the end opposite the end to which the peel is connected. I preferably provide means for raising and lowering the forward end of the peel carrier and other means for raising and lowering the rearward end of the peel carrier. I find it advantageous to employ as the means for raising and lowering the forward end of the peel carrier a bell crank lever pivoted to the support and operated by a fluid pressure cylinder and piston disposed generally horizontally beneath the support. I also preferably employ a fluid pressure cylinder and piston for raising and lowering the rearward end of the peel carrier and the lost motion connection is preferably employed in conjunction therewith.

Other details, objects and advantages of the invention will become apparent as the following description of a present preferred embodiment thereof proceeds.

In the accompanying drawings I have shown a present preferred embodiment of the invention, in which Figure 1 is an elevational view of a manipulator;

Figure 1:
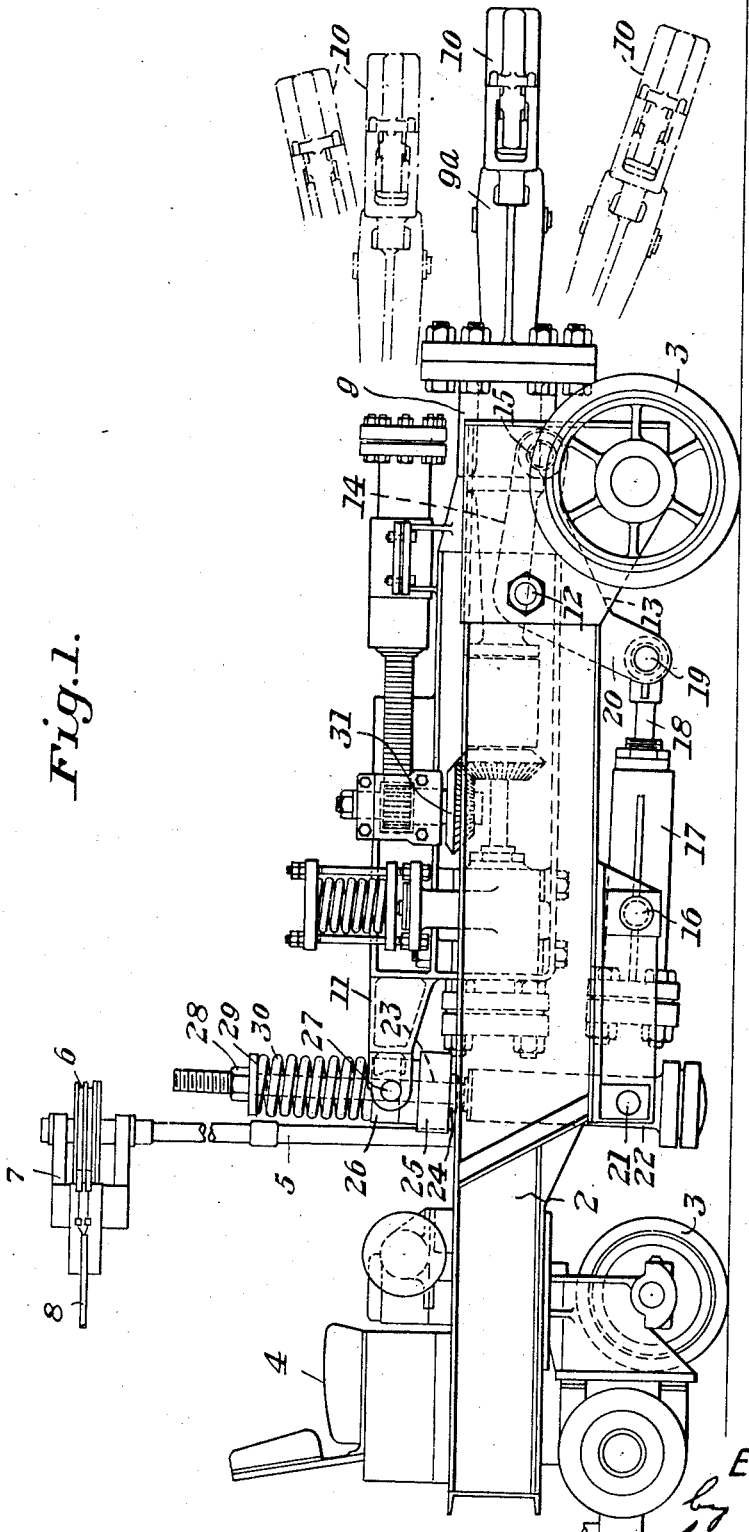
Figure 2:
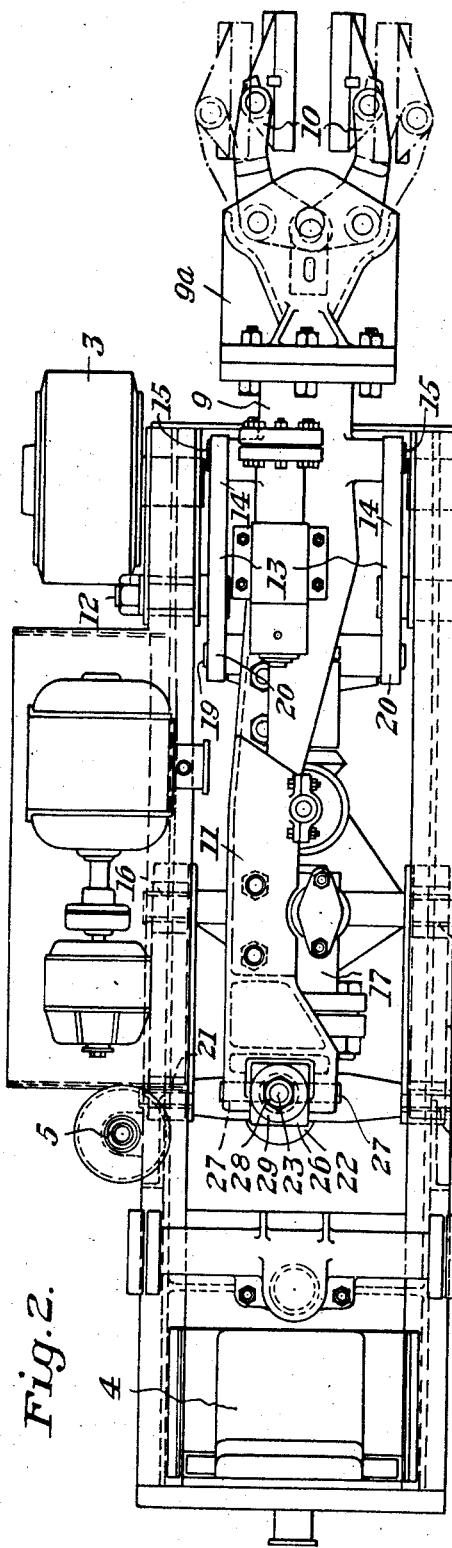
Figure 2 is a plan view of the manipulator shown in Figure 1.
Figure 3:
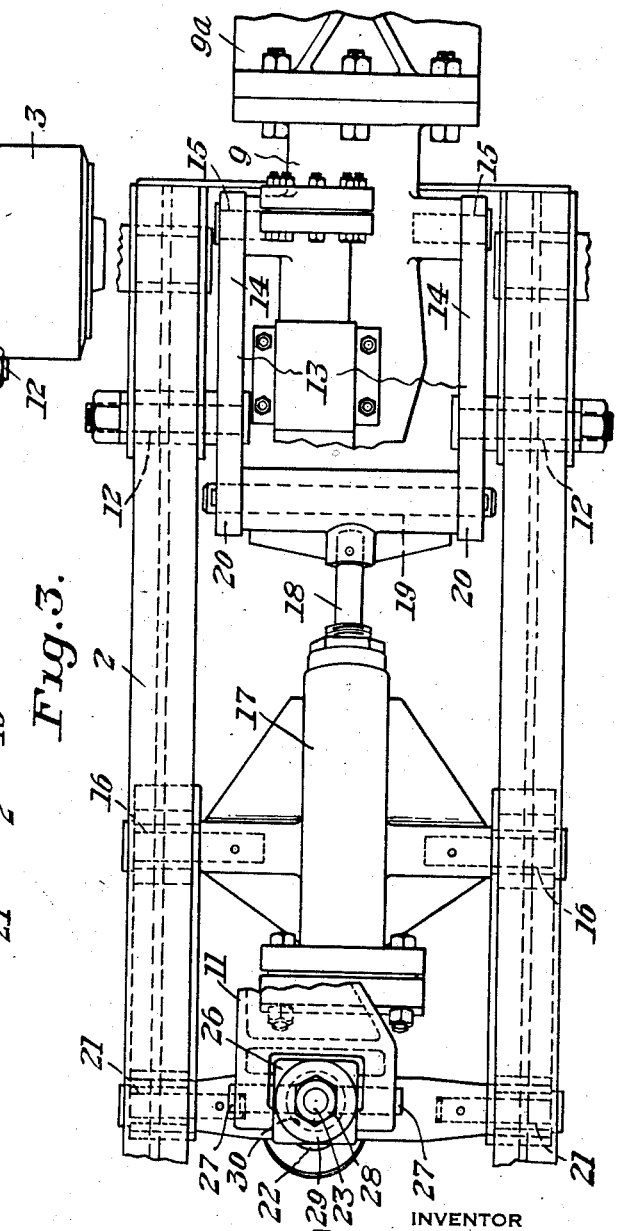
Figure 3 is an enlarged plan view of a portion of the manipulator structure.

Referring now more particularly to the drawings, there is provided a support or frame 2 which may be in the form of a chassis mounted upon wheels 3. Thus the manipulator shown is of the type known as an auto floor manipulator since it can be driven about on the floor between the heating furnaces and the forging apparatus. The operator sits in a seat 4. Extending upwardly from the frame 2 is a hollow mast 5 having at its upper end a contact ring 6 with which cooperates a pivoted contact member 7 with which in turn is connected an electric cable 8. The cable 8 supplies electric power to the manipulator and extends from the contact member 7 to a reel stationarily mounted adjacent the floor which pays out and takes in the cable as necessary as the manipulator moves about. The manipulator is driven about on the wheels 3 by an electric motor operated by the electric current derived from the cable 8, leads passing downwardly within the hollow mast 5 from the contact ring 6 to such motor. The frame also carries a hydraulic pump which is also driven by an electric motor which derives its current from the same source. Suitable controls are provided so that the operator can drive the manipulator about and operate the various mechanisms making up the manipulator. Everything described in this paragraph is old and well known in the art and therefore is not shown and described in detail.

The material handling member of the manipulator is designated generally by reference numeral 9 and comprises a peel 9a having work gripping jaws 10, the peel being rotatably mounted in a peel carrier or frame 11. Pivoted to the main frame 2 at 12 is a bell crank lever 13 having a normally generally horizontally extending arm 14 to which the forward portion of the peel frame 11 is pivoted at 15. Slung beneath the main frame 2 and pivotally carried thereby through horizontal trunnions 16 is a fluid pressure cylinder 17 within which operates a piston having a piston rod 18 pivoted at 19 to the normally generally vertically extending arm 20 of the bell crank lever 13. Connections are provided from the hydraulic pump to the cylinder 17 so that when desired the piston may be moved forward or toward the right viewing Figure 1 to swing the bell crank lever 13 in the counter-clockwise direction about the pivot 12 to raise the front or forward end of the peel frame 11.

Also pivoted to the main frame 2 at 21 is a generally vertical fluid pressure cylinder 22 within which operates a piston having a piston rod 23. The piston rod 23 has integral therewith a collar 24 upon which lies a rubber cushion 25. Resting upon the cushion 25 is a collar or block 26 having a generally vertical bore, viewing Figure 1, through which the piston rod 23 freely passes. The collar 26 has trunnions 27 which pivotally carry the rearward end of the peel frame 11. The piston rod 23 has at its upper end an adjustable nut 28 beneath which bears a stop member 29. Bearing between the under surface of the member 29 and the upper surface of the collar 26 is a compression spring 30.

The peel frame carries means designated generally by reference numeral 31 for rotating the peel and also carries means for opening and closing the peel jaws 10, but as these means for rotating the peel and for opening and closing the peel jaws are old and well known in the art they are not shown and described in detail.

By appropriately manipulating the pistons in the cylinders 17 and 22 the peel may be raised, lowered and tilted as indicated by chain lines in Figure 1. The forward end of the peel frame 11 may be raised and lowered independently of the rearward end and vice versa or the means for changing the elevation of the respective ends of the peel frame may be operated simultaneously, each in either direction desired. Consequently the arrangement provides great flexibility in operation of the peel. When the work is positioned over the anvil for a forging operation the peel may, for example, be in the position shown in solid lines in Figure 1. The forging operation reduces the vertical dimension of the work and tends to push the forward or right-hand end of the peel, viewing Figure 1, down. The force thus exerted on the projecting end of the peel is very great. Upon a forging operation the peel frame 11 partakes, due to the downward shock or force exerted upon the forward end of the peel, of slight pivotal movement about the pivot 15. Such pivotal movement is permitted by the spring 30 which allows the collar 26 to rise somewhat from the cushion 25. When the forging hammer is raised the collar 26 resumes its position resting upon the cushion 25 which acts as a recoil shock absorber. Thus the spring 30 provides for flexible or lost motion support of the peel carrier and peel or material handling member whereby to relieve the manipulator as a whole of stresses which would otherwise result in rapid deterioration of the apparatus.

If the rearward or left-hand end of the peel frame viewing Figure 1 is sufficiently heavily weighted the spring 30 may be omitted so that the connection between the peel frame and the main frame 2 is a pure non-resilient lost motion connection. However, I prefer to employ the spring 30 which with the slidable collar 26 provides a resilient or spring pressed lost motion connection.

The positioning of the spring 30 adjacent the rearward end of the peel frame removes such spring from the zone of greatest heat to which the forward end of the peel is subjected. The manipulator is commonly used for inserting billets or the like into heating furnaces and withdrawing the same from the furnaces and then holding the heated billets while they are forged. Consequently the forward end of the peel is subjected to very high temperatures which would have a deteriorating effect upon springs near such forward end. Moreover, the arrangement of the means including the piston and bell crank lever for raising and lowering the forward end of the peel frame makes the provision of the lost motion connection at the rearward end of the peel frame especially important as without such lost motion connection the bell crank lever 13 would be subjected to severe bending stresses on each forging operation. Moreover, the slinging of the cylinder 17 beneath the main frame 2 in the manner shown and described enables lowering of the forward end of the peel to a position very close to the floor without imparting to the peel an undesirably great angle of inclination.

While I have shown and described a present preferred embodiment of the invention it is to be distinctly understood that the invention is not limited thereto but may be otherwise variously embodied within the scope of the following claims.

I claim:

1. In a manipulator, a support, a material handling member having a material carrying portion projecting forwardly from said support, means including a power applying member disposed at least for the most part beneath the support for raising and lowering the forward portion of said material handling member and means including a separate power applying member and a lost motion connection for raising and lowering the rearward portion of said material handling member.

2. In a manipulator, a support, a material handling member having a material carrying portion projecting forwardly from said support, means including a bell-crank lever to which the material handling member is directly pivoted for raising and lowering the forward portion of said member and means including a resilient lost motion connection permitting pivotal movement of said member about its connection with the bell-crank lever when said member is subjected to shock for raising and lowering the rearward portion of said member, said connection urging the rearward portion of said member downwardly.

3. In a manipulator, a suport, a material handling member having a material carrying portion disposed at one end thereof, the material handling member being pivotally mounted on the support adjacent said end of the material handling member so that when material carried by the material carrying portion is acted on the material handling member tends to turn about said pivotal mounting and resilient means acting between the support and the material handling member adjacent the opposite end of the material handling member yieldingly opposing the tendency of the material handling member to turn about said pivotal mounting.

4. In a manipulator, a support, a material handling member having a material carrying portion disposed at one end thereof, an operating member carried by the support, positive motion transmitting means including a generally horizontal pivot connecting the material handling member adjacent said end thereof and the operating member so that upon operation of the operating member the elevation of said end of the material handling member may be altered and resilient means acting between the support and the material handling member adjacent the opposite end of the material handling member to permit limited turning of the material handling member about said pivot when shocks are imparted to the material handling member.

5. In a manipulator, a support, a material handling member having a material carrying portion disposed at one end thereof, means for mounting the material handling member on the support including a lever pivoted to the support and to which the material handling member is directly pivoted for raising and lowering the portion of the material handling member adjacent said end and resilient means acting between the support and the material handling member adjacent the opposite end of the material handling member to permit limited turning of the material handling member about said pivot when shocks are imparted to the material handling member.

6. In a manipulator, a support, a material handling member having a material carrying portion disposed at one end thereof, an operating member carried by the support, positive motion transmitting means including a generally horizontal pivot connecting the material handling member adjacent said end thereof and the operating member so that upon operation of the operating member the elevation of said end of the material handling member may be altered and means including a lost motion connection connecting the material handling member and the support adjacent the opposite end of the material handling member for raising and lowering said opposite end of the material handling member and to permit limited turning of the material handling member about said pivot when shocks are imparted to the material handling member.

EDGAR E. BROSIUS.